March 10, 1970     G. SCHRADER     3,499,287
MASTER CYLINDER FOR HYDRAULIC INSTALLATIONS
Filed Feb. 2, 1968
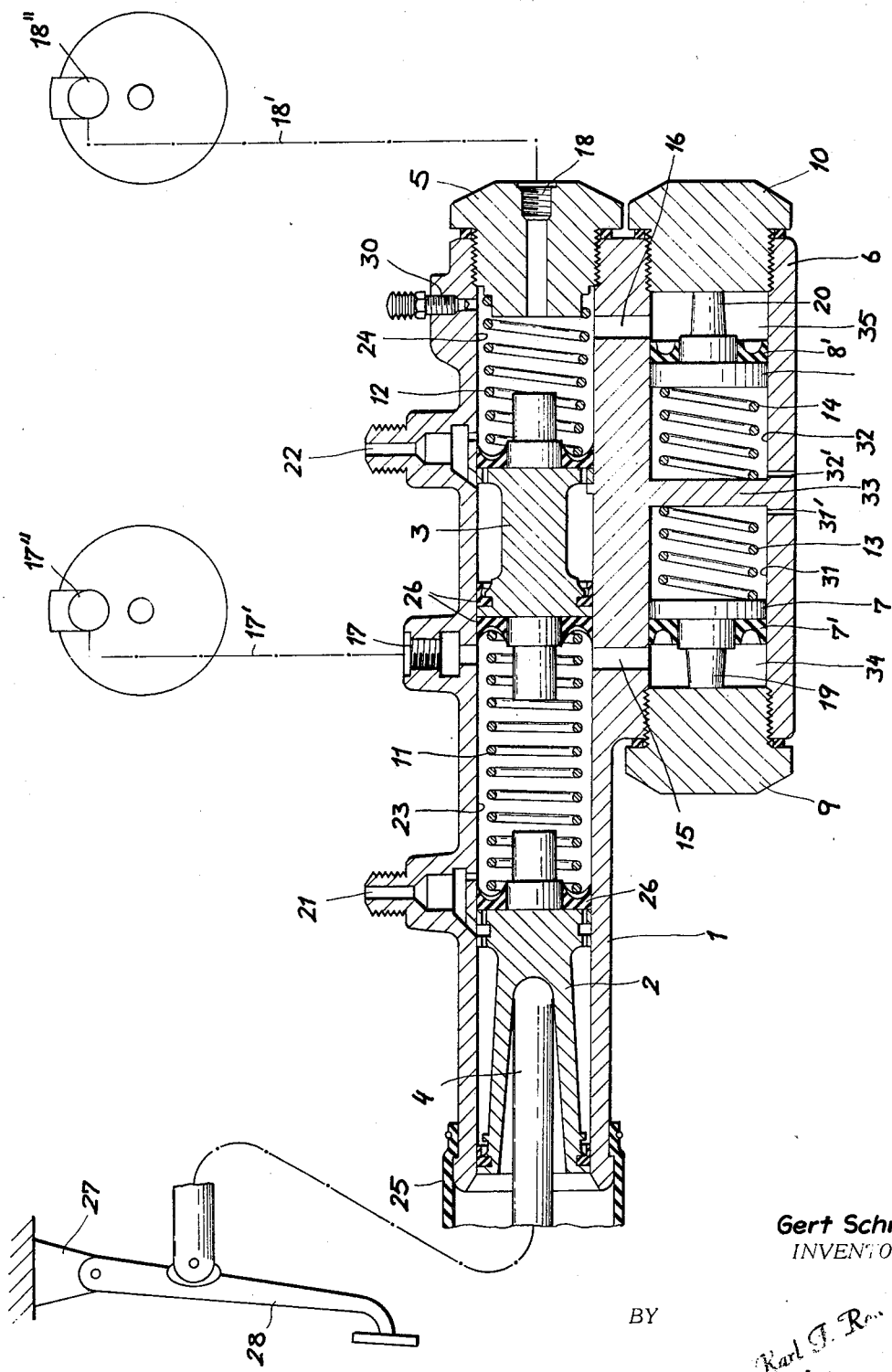
Gert Schrader
INVENTOR.

United States Patent Office 3,499,287
Patented Mar. 10, 1970

3,499,287
MASTER CYLINDER FOR HYDRAULIC INSTALLATIONS
Gert Schrader, Walldorf, Hessen, Germany, assignor to Alfred Teves GmbH, Frankfurt am Main, Germany, a corporation of Germany
Filed Feb. 2, 1968, Ser. No. 702,594
Claims priority, application Germany, Feb. 3, 1967, T 33,141
Int. Cl. F15b 7/08, 15/00; B60t 11/16
U.S. Cl. 60—54.5                                          7 Claims

ABSTRACT OF THE DISCLOSURE

A dual-network brake system for automotive vehicles wherein individual fluid-transmission networks deliver respective streams of fluid to the wheel-brake cylinders and the dual master cylinder is provided with expansible chambers for the admission of pressurized fluid whenever the pressure in the system exceeds a predetermined maximum. The expansion of the chambers, and the ensuing drop in the pressure, is effected against spring-biased pistons in a housing connected to the master cylinder of the brake system.

---

My present invention relates to a dual-network brake system for automotive vehicles and more particularly, to a brake system incorporating an expansible reservoir for the temporary storage of pressurized hydraulic fluid and the concurrent reduction of excess pressure which may have been generated in the brake system due to unforeseeable circumstances.

Under normal conditions the material strength and the dimensions of the master brake cylinder, of the wheel-brake cylinders and of the tubes and flexible hosing comprising an automotive brake system of the type referred to, are capable of resisting the force applied through the foot brake pedal of the vehicle and transmitted through the hydraulic fluid. Under certain circumstances however, the pressure may not be evenly transmitted, resulting in overloading or one-sided loading which can damage the parts exposed to the excess pressure and make the entire brake assembly inoperative. For example, the failure of one network can increase the load on the operating wheel-brake network to a degree which may lead to the bursting of the wheel brake cylinder walls.

It is an object of my present invention to eliminate the danger arising from a temporary and unforeseeable pressure build-up, and to provide a safe and reliable brake system of simple construction.

Another object is to provide means for testing brake systems before the vehicle is put into operation, regardless of the applied pressure and without the risk of cracked brake-cylinder walls.

These objects and others which will become apparent hereinafter, are attained, in accordance with the present invention, through control compartments in a housing forming part of the master brake cylinder and containing a pair of opposing spring-biased pistons which advance under the pressure of the admitted hydraulic fluid and return when expansion of the fluid has dropped the pressure to a predetermined safe value. The amplitude of the piston motion is governed by the resistance of the springs which are pre-stressed relative to the permissible pressure maximum (bursting strength) which the wheel-brake cylinder walls can tolerate without bursting.

The above and other objects, features and advantages of my invention will become more readily apparent from the following description, reference being made to the accompanying drawing the sole figure of which is an axial cross-sectional view of a brake system according to my invention.

In the drawing, there is shown a dual-network tandem-master cylinder comprising a housing 1 wherein a pair of axially aligned pistons 2 and 3 are provided to displace hydraulic fluid and generate pressure in the brake networks via the outlet ports 17 and 18 respectively. These ports are connected via transmission line 17' and 18' to the wheel-brake cylinders 17" and 18" of the vehicle. The check-valve systems customarily provided, and designed to retain pressure in the lines 17 and 18 respectively, at least to a limited extent, when the foot brake pedal 28 is released, have not been illustrated but may be of the type shown in Principles of Automotive Vehicles, U.S. Government Printing Office, Washington, D.C. 1956, pages 438 f.f. Piston 2 whose primary cup is shown at 26, is driven forward by the link rod 4, which is connected to the brake pedal 28. The latter is fulcrumed to the vehicle body at 27. The piston 2 is actuated by the force applied to the vehicle brake pedal 28. The cuff 25 prevents the entry of contaminants into the interior of the master cylinder. The compression spring 11 in the interior of the working chamber 23 separates piston 2 from piston 3 which operates, at its opposite end, against the spring 12 inside the working chamber 24; spring 12 abuts against the end plug 5 of the master cylinder. A bleed valve 30 of the conventional type is set into the outer wall of the working space 24 to eliminate air from the system. Inlet ports 21 and 22 connect the working chamber 23 and 24 respectively to fluid reservoirs (not shown but of the type illustrated in Principles of Automotive Vehicles, supra).

The safety reservoir or accumulator 6 lying parallel to the direction of thrust in the tandem master cylinder, and comprising the two axially aligned compartments 34 and 35, is connected to the master cylinder by the bores 15 and 16 which terminate respectively in the working spaces 23 and 24. End closures 9 and 10 seal off the reservoir 6 against the outside. The inside of the reservoir 6 is partitioned by the divider 33 into two equal-sized parts. The plunger 7 has its sealing cup 7' facing away from the pre-stressed spring 13 in the compartment 31; the piston 8 has its primary cup 8' turned in the opposite direction to the piston 7 and is urged by the pre-stressed spring 14 of the compartment 32. The pistons 6 and 7 are held away from the end covers 9 and 10 by the spacers 19 and 20 which are attached to the pistons. Compartments 31 and 32 are vented at 31' and 32' to the atmosphere.

The prestress applied to the springs 13 and 14 is proportional to the permissible maximum pressure to which the system can be exposed without danger of deterioration or inadequacy. When malfunction decreases or blocks the fluid transmission to one of the networks, the force applied to the foot pedal 28 increases the pressure on the other network. When the pressure in the working spaces 23 or 24 and in the communicating bores 15 or 16 exceeds a predetermined value (less than that corresponding to the bursting strength of the wheel-brake cylinders), the pistons 6 or 7 respectively are pushed against the springs 13 or 14 respectively, which are compressed by the excess force and thereby increase the volume adapted to receive hydraulic fluid under excess pressure from the working spaces 23 or 24 respectively. When the brake pedal is released, the reaction of the springs 13 or 14 drives the pistons 6 or 7 back against the pivots 19 or 20 and returns the fluid to the master brake cylinder. Additional working tanks or buffer storage reservoirs may be connected to the safety reservoir 6 in order to increase its capacity.

I claim:
1. In a dual-network brake system of an automotive vehicle, in combination, a pair of individually pressuriz- able fluid-transmission networks, respective wheel-brake assemblies connected to and operable by said networks, and a master-cylinder assembly for transmitting hydraulic-fluid pressure to wheel-brake assemblies, said master-cylinder assembly comprising housing means forming a two-section brake master cylinder with at least one cylinder bore defining a pair of working chambers respectively connected to said networks, respective intake ports formed in said housing means for delivering hydraulic fluid to said chambers and respective outlet ports formed in said housing means communicating with the respective fluid-transmission networks, a pair of jointly displaceable pistons respectively received in said chambers to drive said fluid into said networks, hydraulic pressure accumulator means, and passage means connecting said accumulator means to said chambers in parallel with said wheel-brake assemblies for absorbing hydraulic overloads developed in said chambers while maintaining a separation between the fluids in said networks.

2. The combination defined in claim 1 wherein said accumulator means is an accumulator formed on said housing means and provided with a partition subdividing it into two separate accumulator compartments each communicating with one chamber of said brake-master cylinder.

3. The combination defined in claim 2 wherein each of said accumulator compartments is provided with a respective plunger, spring means bearing upon said plunger and resisting displacement thereof, said passage means including a respective bore connecting each of said chambers with a respective accumulator compartment ahead of the respective plunger in the direction of displacement thereof by the corresponding spring means.

4. The combination defined in claim 3 wherein said accumulator compartments are generally coaxial and open away from one another, said spring means urging said plungers away from said partition and toward open ends of said accumulator compartments, said accumulator compartments each being sealed at its open end by a respective closure, said plunger being provided with abutment members engageable with the respective closure members in a depressurized condition of the respective chambers.

5. The combination defined in claim 4 wherein said chambers are formed in tandem in said housing means and said pistons are axially aligned, said accumulator compartments being disposed in tandem along an axis parallel to the axis of said chambers.

6. The combination defined in claim 4 wherein the spring means of each of said plungers is a respective coil spring received between the plunger and said partition.

7. The combination defined in claim 6 wherein said springs are precompressed.

References Cited

UNITED STATES PATENTS

| 1,652,232 | 12/1927 | Blasdel. | |
|---|---|---|---|
| 2,209,595 | 7/1940 | Brock. | |
| 2,467,887 | 4/1949 | Gladden. | |
| 2,597,953 | 5/1952 | Rozanski et al. | 60—54.6 XR |
| 3,074,235 | 1/1963 | Hager. | |

FOREIGN PATENTS

| 368,823 | 9/1931 | Great Britain. |
|---|---|---|
| 537,667 | 11/1931 | Germany. |
| 547,062 | 9/1922 | France. |

MARTIN P. SCHWADRON, Primary Examiner

ROBERT R. BUNEVICH, Assistant Examiner

U.S. Cl. X.R.

188—152